(12) United States Patent
Masuda et al.

(10) Patent No.: US 12,131,207 B2
(45) Date of Patent: Oct. 29, 2024

(54) INFORMATION PROCESSING APPARATUS, INFORMATION PROCESSING METHOD, PROGRAM, AND INFORMATION PROCESSING SYSTEM

(71) Applicant: DAIKIN INDUSTRIES, LTD., Osaka (JP)

(72) Inventors: Yoshiyuki Masuda, Osaka (JP); Shinji Shimojo, Osaka (JP); Matsuki Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/546,480

(22) PCT Filed: Mar. 1, 2022

(86) PCT No.: PCT/JP2022/008592
§ 371 (c)(1),
(2) Date: Aug. 15, 2023

(87) PCT Pub. No.: WO2022/186195
PCT Pub. Date: Sep. 9, 2022

(65) Prior Publication Data
US 2024/0036958 A1   Feb. 1, 2024

(30) Foreign Application Priority Data

Mar. 2, 2021  (JP) .................................. 2021-032383

(51) Int. Cl.
*G06F 9/54* (2006.01)
*G06F 9/455* (2018.01)

(52) U.S. Cl.
CPC .......... *G06F 9/547* (2013.01); *G06F 9/45558* (2013.01); *G06F 2009/45595* (2013.01)

(58) Field of Classification Search
CPC ................ G06F 9/547; G06F 9/45558; G06F 2009/45595
See application file for complete search history.

(56) References Cited

U.S. PATENT DOCUMENTS

| 10,338,980 B2 * | 7/2019 | Hoebeke ............. H04L 12/2809 |
| 2017/0251325 A1 * | 8/2017 | Sakamoto ............... H04L 61/35 |

(Continued)

FOREIGN PATENT DOCUMENTS

| JP | 2018-180682 | 11/2018 |
| WO | 2018/209195 | 11/2018 |

OTHER PUBLICATIONS

International Search Report for PCT/JP2022/008592 mailed on May 10, 2022.

(Continued)

*Primary Examiner* — Kenneth Tang
(74) *Attorney, Agent, or Firm* — IPUSA, PLLC

(57) ABSTRACT

An acquiring unit configured to connect via a network to a device management system that manages functions of devices, and acquire device management information based on which a device usable by a user and a function usable by the user among functions of the device are managed from the device management system; a generating unit configured to generate a WebAPI based on the device management information acquired, and generate a virtual device configured to respond to an access to the WebAPI in cooperation with the device; an informing unit configured to inform a terminal used by the user of information including how to access the WebAPI; and an accessing unit configured to access the device via the virtual device are provided.

10 Claims, 12 Drawing Sheets

(56) References Cited

U.S. PATENT DOCUMENTS

| | | | |
|---|---|---|---|
| 2019/0109921 A1* | 4/2019 | Matsushima | H04L 41/044 |
| 2019/0114293 A1* | 4/2019 | Li | G06F 9/547 |
| 2020/0028852 A1* | 1/2020 | Sakamoto | H04L 63/101 |
| 2020/0177681 A1* | 6/2020 | Wang | H04L 41/0803 |
| 2020/0204637 A1* | 6/2020 | Wang | H04L 67/565 |
| 2020/0228948 A1* | 7/2020 | Watfa | H04W 48/14 |
| 2021/0075869 A1* | 3/2021 | Li | H04W 4/70 |
| 2021/0211509 A1* | 7/2021 | Ly | H04L 41/22 |
| 2022/0029994 A1* | 1/2022 | Choyi | H04L 63/0892 |
| 2022/0286525 A1* | 9/2022 | Wang | H04W 4/70 |
| 2023/0038486 A1* | 2/2023 | Worman | G06Q 10/06 |
| 2023/0300209 A1* | 9/2023 | Li | H04L 67/565 370/254 |

OTHER PUBLICATIONS

International Preliminary Report on Patentability for PCT/JP2022/008592 mailed on Sep. 14, 2023.
Extended European Search Report mailed on Apr. 5, 2024 with respect to the corresponding European patent application No. 22763250.2.

* cited by examiner

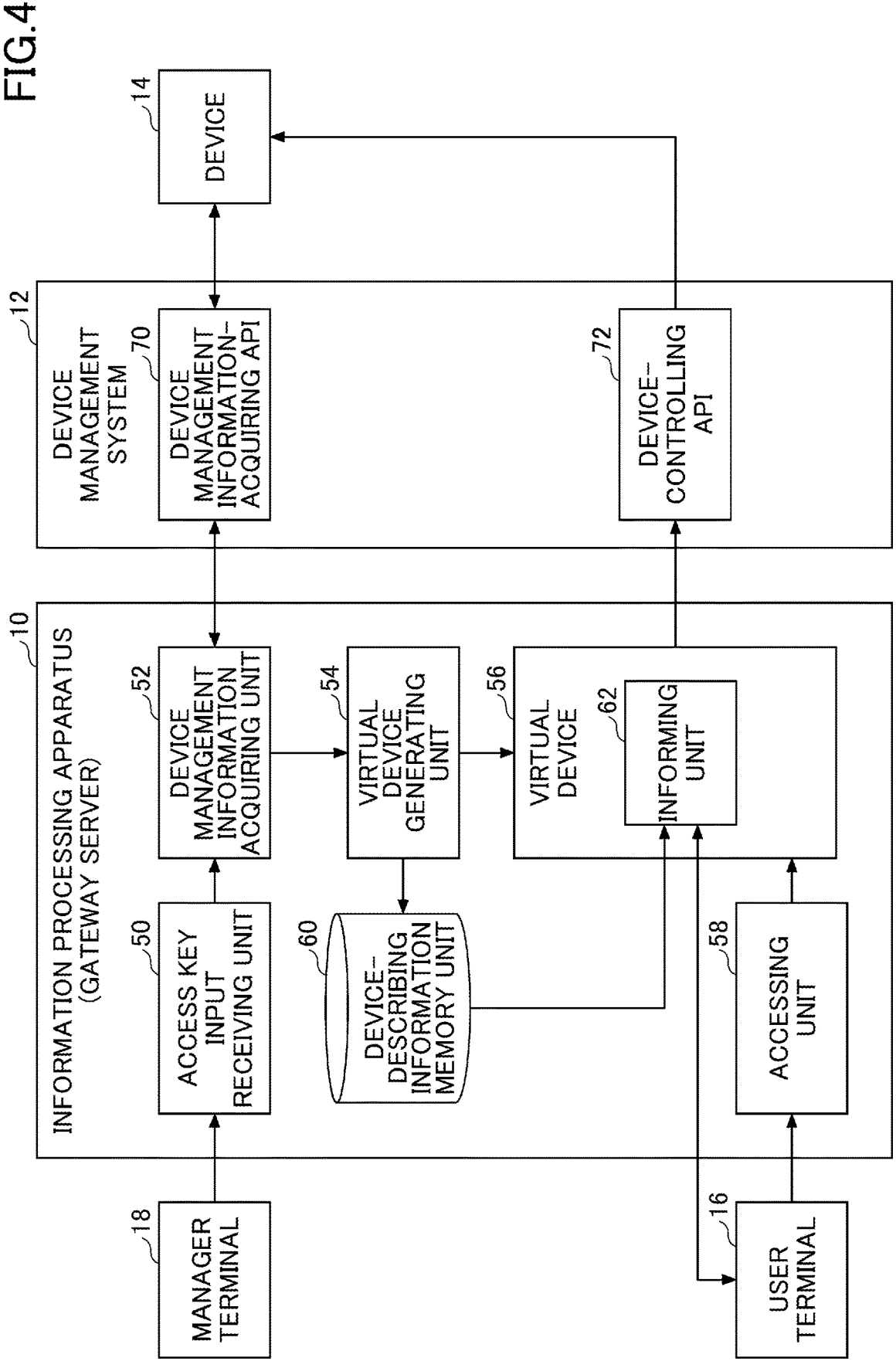

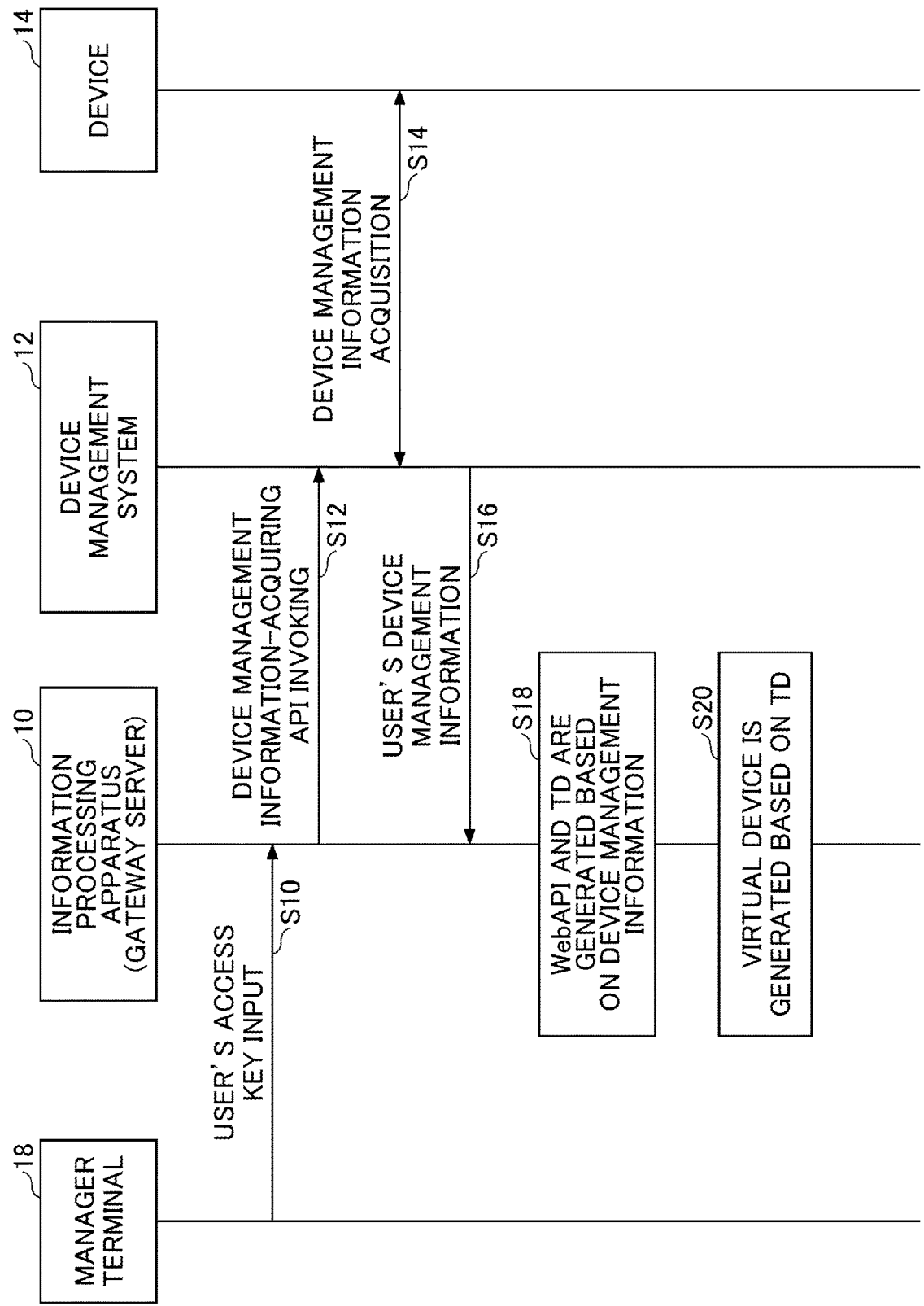

INFORMATION PROCESSING APPARATUS, INFORMATION PROCESSING METHOD, PROGRAM, AND INFORMATION PROCESSING SYSTEM

TECHNICAL FIELD

The present disclosure relates to an information processing apparatus, an information processing method, a program, and an information processing system.

BACKGROUND ART

In recent years, cloud services have become available from various devices, because such various devices have become connectable to networks such as the Internet along with the development of the Internet of Things (IoT). Moreover, as one framework for operating devices via networks or acquiring information from devices, a technique of accessing the devices using a Web technique referred to as Web of Things (WoT) is being studied.

According to this technique, terminals access the devices by using a document that is referred to as a Thing Description (TD) and describes, for example, a name of the device, a name of a function possessed by the device, and how to access the function. For example, for sharing of devices, a technique of performing access control suited to users has been hitherto known because devices that can be used and functions of devices that can be used are different depending on users (for example, see PTL 1).

CITATION LIST

Patent Literature

[PTL 1] Japanese Patent Application Publication No. 2018-180682

SUMMARY OF INVENTION

Technical Problem

For example, there exists an open-source WebThings as a platform for supporting WoT implementation. WebThings provides a WebThings framework for generating a Thing, and a Gateway server configured to collectively manage Things. When various users and devices co-exist, it is necessary to register device management information for access control purposes with the Gateway server in order to realize device access control suited to users. However, devices often have their unique management systems (hereinafter, referred to as a device management system) to realize access control. When device management information has already been registered with the device management system, the Gateway server will double-manage similar device management information, leading to a problem that the number of steps involved in the development increases.

An object of the present disclosure is to provide an information processing apparatus, an information processing method, a program, and an information processing system that can realize a control on a user's access to a device based on device management information acquired from a device management system.

Solution to Problem

An information processing apparatus according to the present disclosure includes: an acquiring unit configured to connect via a network to a device management system that manages functions of devices, and acquire device management information based on which a device usable by a user and a function usable by the user among functions of the device are managed from the device management system; a generating unit configured to generate a WebAPI based on the device management information acquired, and generate a virtual device that is configured to respond to an access to the WebAPI in cooperation with the device; an informing unit configured to inform a terminal used by the user of information including how to access the WebAPI; and an accessing unit configured to access the device via the virtual device.

According to the present disclosure, it is possible to realize a control on a user's access to a device via a virtual device, by acquiring device management information based on which a device usable by the user and a function usable by the user are managed from the device management system, and generating the virtual device based on the device management information acquired.

The acquiring unit may provide an access key to the device management system and acquire the device management information via a device management information-acquiring API of the device management system corresponding to the access key, and the generating unit may generate the virtual device that is based on the device management information.

According to the present disclosure, it is possible to acquire the device management information via the device management information-acquiring API of the device management system corresponding to the access key, and generate the virtual device based on the device management information acquired.

The generating unit may generate device-describing information based on which device information is shared in the information processing apparatus based on the device management information, and generate the virtual device based on the device-describing information.

According to the present disclosure, it is possible to share device information in the information processing apparatus, and generate device-describing information based on which the virtual device is generated based on the device management information acquired from the device management system.

The information processing apparatus may receive an access to the WebAPI from the terminal, and access the device via the device management system that mediates an instruction from the WebAPI to the device.

According to the present disclosure, an access from the terminal to the WebAPI can be received, such that the user can access the device via the device management system that mediates an instruction from the WebAPI to the device.

The information processing apparatus may further include a virtual device for control with which one or more access keys are registered. The virtual device for control may provide the access key to the device management system such that the device management information is acquired via a device management information-acquiring API of the device management system corresponding to the access key, and the generating unit may generate the virtual device that is based on the device management information.

According to the present disclosure, it is possible to acquire the device management information via a device management information-acquiring API of the device management system corresponding to the one or more access keys registered.

The virtual device for control may be generated per user.

According to the present disclosure, it is possible to manage, per user, one or more access keys that are registered.

The information processing apparatus may further include an access key managing unit configured to manage authentication information of the user and the access key in association with each other.

According to the present disclosure, it is possible to manage authentication information of the user and the access key in association with each other.

The information processing apparatus may further include a device-describing information output unit configured to output the device-describing information generated by the generating unit.

According to the present disclosure, it is possible to realize an external output function for outputting the device-describing information to any other IoT system.

The device management information may include one or more selected from a name of the device, data that can be acquired collaterally with the device, information regarding a function that can be used collaterally with the device, and access information based on which the device is accessed.

According to the present disclosure, it is possible to include one or more selected from a name of the device, data that can be acquired collaterally with the device, information regarding a function that can be used collaterally with the device, and access information based on which the device is accessed, in the device management information.

According to an information processing method of the present disclosure, an information processing apparatus performs: connecting via a network to a device management system that manages functions of devices, and acquiring device management information based on which a device usable by a user and a function usable by the user among functions of the device are managed from the device management system; generating a WebAPI based on the device management information acquired, and generating a virtual device configured to respond to an access to the WebAPI in cooperation with the device; informing a terminal used by the user of information including how to access the WebAPI; and accessing the device via the virtual device.

According to the present disclosure, it is possible to realize a control on a user's access to a device via a virtual device, by acquiring device management information based on which a device usable by the user and a function usable by the user are managed from the device management system, and generating the virtual device based on the device management information acquired.

A program according to the present disclosure causes an information processing apparatus to execute: connecting via a network to a device management system that manages functions of devices, and acquiring device management information based on which a device usable by a user and a function usable by the user among functions of the device are managed from the device management system; generating a WebAPI based on the device management information acquired, and generating a virtual device configured to respond to an access to the WebAPI in cooperation with the device; informing a terminal used by the user of information including how to access the WebAPI; and accessing the device via the virtual device.

According to the present disclosure, it is possible to realize a control on a user's access to a device via a virtual device, by acquiring device management information based on which a device usable by a user and a function usable by the user are managed from the device management system, and generating the virtual device based on the device management information acquired.

An information processing system according to the present disclosure is an information processing system including: a device management system configured to manage functions of devices; and an information processing apparatus connected via a network to a terminal used by a user and to the device management system, wherein the device management system includes a device management information-acquiring API configured to provide device management information based on which a device usable by the user and a function usable by the user among functions of the device are managed, and the information processing apparatus includes: an acquiring unit configured to acquire device management information of the user via the device management information-acquiring API of the device management system; a generating unit configured to generate a WebAPI based on the device management information acquired, and generate a virtual device configured to respond to an access to the WebAPI in cooperation with the device; an informing unit configured to inform the terminal used by the user of information including how to access the WebAPI; and an accessing unit configured to access the device via the virtual device.

According to the present disclosure, it is possible to realize a control on a user's access to a device via a virtual device, by acquiring device management information based on which a device usable by a user and a function usable by the user are managed from the device management system, and generating the virtual device based on the device management information acquired.

BRIEF DESCRIPTION OF DRAWINGS

FIG. 4 is an example functional block diagram of an information processing system according to an embodiment.

FIG. 5 is an example sequence diagram of a device registration process.

DESCRIPTION OF EMBODIMENTS

Next, embodiments of the present invention will be described in detail.

[First Embodiment]

<System Configuration>

Figure 1:
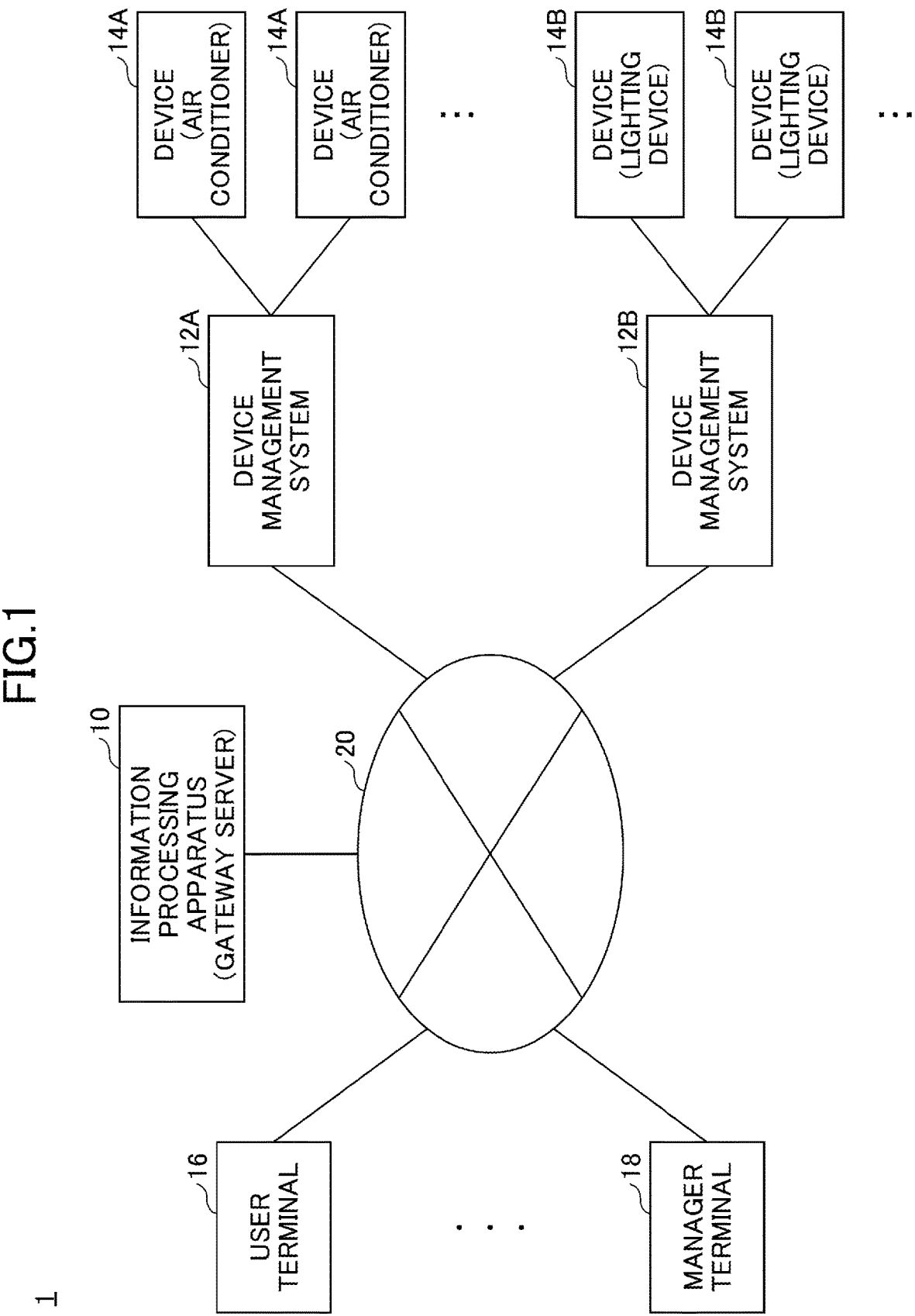
FIG. 1 is an example configuration diagram of an information processing system according to an embodiment.

FIG. 1 is an example configuration diagram of an information processing system according to the present embodiment. The information processing system 1 of FIG. 1 includes an information processing apparatus 10, a device management system 12A, a device management system 12B, devices 14A, devices 14B, user terminals 16, and a manager terminal 18.

The information processing apparatus 10, the device management system 12A, the device management system 12B, the user terminals 16, and the manager terminal 18 of the information processing system 1 are connected to a network 20 such as the Internet. The devices 14A and 14B are connected to the network 20 via the device management systems 12A or 12B.

The devices 14A and 14B are devices existing at various locations, such as air conditioners, lighting devices, cameras, and thermometers. In a case of referring to any device of the devices 14A and 14B, reference may be simply made to the device 14. The devices 14 are configured to send back information of some type or to perform a control of some type in response to a call from a device management information-acquiring API or a device-controlling API described below.

The device management systems 12A and 12B are an example of unique management systems configured to realize, for example, control on accesses to the devices 14A and 14B. For example, in the information processing system 1 of FIG. 1, the device management system 12A represents a management system for the devices 14A, which are air conditioners serving as, for example, building facilities. In the information processing system 1 of FIG. 1, the device management system 12B represents a management system for the devices 14B, which are lighting devices serving as, for example, building facilities.

The user terminals 16 are terminals used by users, and are information processing terminals such as a PC, a smartphone, and a tablet terminal. The manager terminal 18 is a terminal used by a manager, and is an information processing terminal such as a PC, a smartphone, and a tablet terminal.

The information processing apparatus 10 uses an open-source WebThings as a platform for supporting WoT implementation, and realizes a WebThings framework for generating Things, and a Gateway server configured to collectively manage Things. In the WoT, a device 14 is described as an abstracted model referred to as a Thing, and, for example, metadata, properties, or interfaces of the Thing are described in a JSON-format file referred to as a TD. The TD is an example of device-describing information. The information processing apparatus 10 is, for example, a computer such as a workstation and a PC.

In the WoT, a virtual device, which is a description of a device 14 as an abstracted model, is defined on the information processing apparatus 10. A user accesses the device 14 managed by the device management system 12 from the user terminal 16 via the virtual device. The information processing system 1 of FIG. 1 realizes control on accesses to the devices 14, which is suited to users, in an operation management system for a building facilities-complex including various types of devices 14.

In the information processing system 1 of FIG. 1, it is necessary to register information regarding a device 14 usable by a user and a function of the device 14 usable by the user with the information processing apparatus 10, for realizing user-suited control on accesses to a plurality of types of devices 14 based on the WoT. In the information processing system 1 according to the present embodiment, the information regarding a device 14 usable by a user and a function of the device 14 usable by the user is acquired from the device management system 12 as device management information as described below.

The configuration of the information processing system 1 of FIG. 1 is an example, and a configuration in which the information processing apparatus 10 is realized by a plurality of computers is possible. Needless to say, the information processing system 1 of FIG. 1 has various system configuration examples depending on uses and purposes.

<Hardware Configuration>

Figure 2:
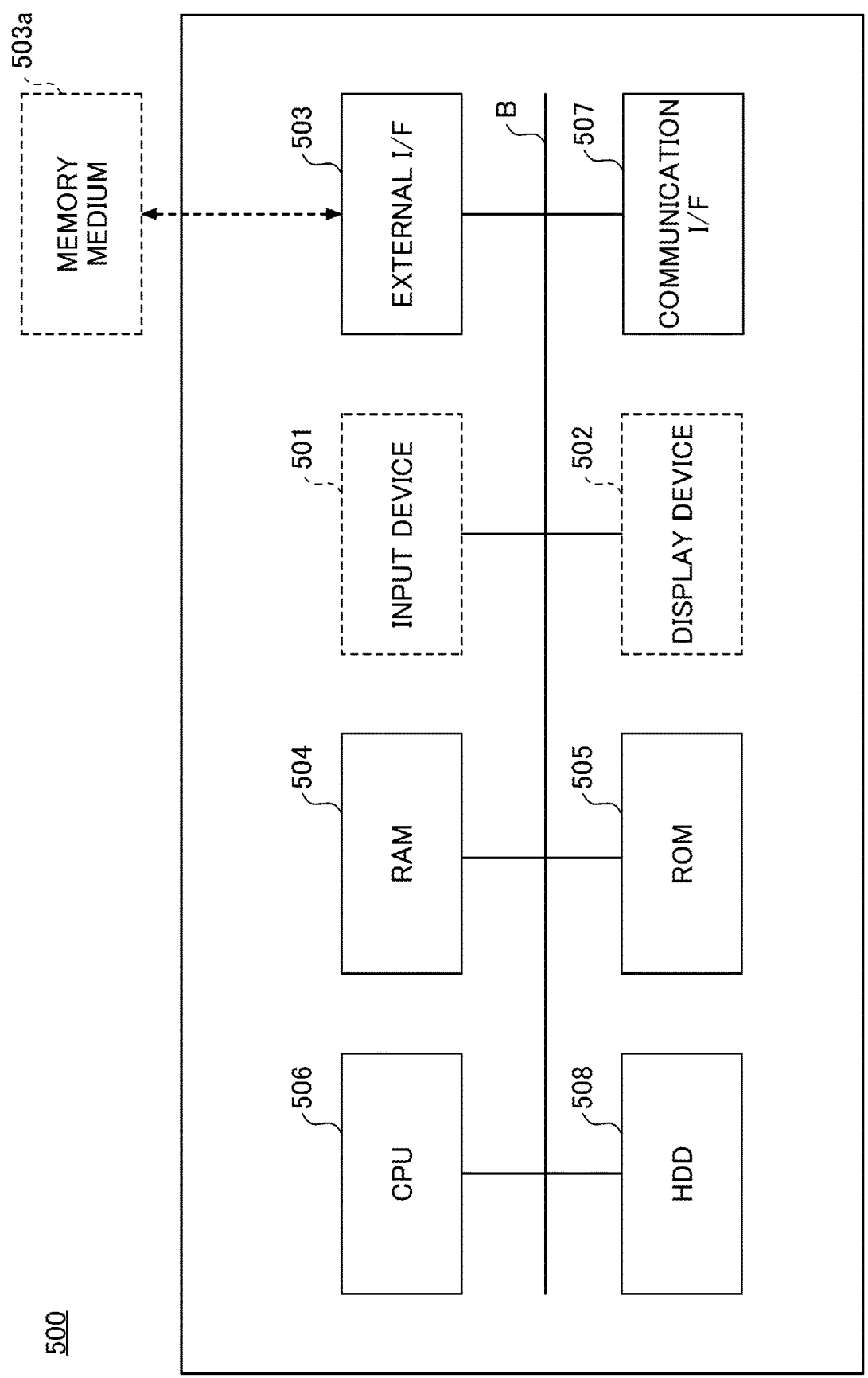
FIG. 2 is an example hardware configuration diagram of a computer according to an embodiment.

The information processing apparatus 10, the device management systems 12, the user terminals 16, and the manager terminal 18 of FIG. 1 are realized by, for example, a computer 500 having the hardware configuration illustrated in FIG. 2.

FIG. 2 is an example hardware configuration diagram of a computer according to the present embodiment. The computer 500 of FIG. 2 includes, for example, an input device 501, a display device 502, an external I/F 503, a RAM 504, a ROM 505, a CPU 506, a communication I/F 507, and an HDD 508, which are mutually connected through a bus B. The input device 501 and the display device 502 may be connected and used as needed.

The input device 501 is, for example, a touch panel, operation keys or buttons, and a keyboard and a mouse used by users such as the users and the manager to input various signals. The display device 502 is constituted by a display such as of a liquid crystal or organic EL configured to display a screen image, and a loudspeaker configured to output sound data such as sound, voice, and music. The communication I/F 507 is an interface via which the computer 500 performs data communication via the network.

The HDD 508 is an example of a nonvolatile memory device storing programs and data. The programs and data stored include an OS, which is basic software for controlling the entire computer 500, and applications for providing various functions on the OS. Instead of the HDD 508, the computer 500 may use a drive device (e.g., a solid state drive: SSD) that employs a flash memory as a memory medium.

The external I/F 503 is an interface to external devices. The external devices include a memory medium 503a. Hence, the computer 500 can read out from or write into the memory medium 503a via the external I/F 503. Examples of the memory medium 503a include a flexible disk, a CD, a DVD, an SD memory card, and a USB memory.

The ROM 505 is an example of a nonvolatile semiconductor memory (memory device) that can retain programs and data even after power supply is cut. Programs and data such as BIOS executed when the computer 500 is started, OS settings, and network settings are stored in the ROM 505. The RAM 504 is an example of a volatile semiconductor memory (memory device) configured to retain programs and data temporarily.

The CPU 506 is an operating device configured to read out programs and data from a memory device such as the ROM 505 and the HDD 508 onto the RAM 504, and execute processes, to realize control on the entire computer 500 and functions. The information processing apparatus 10 according to the present embodiment can realize various functional blocks as described below.

<Registration of Device Management Information with Gateway Server>

Figure 3A:
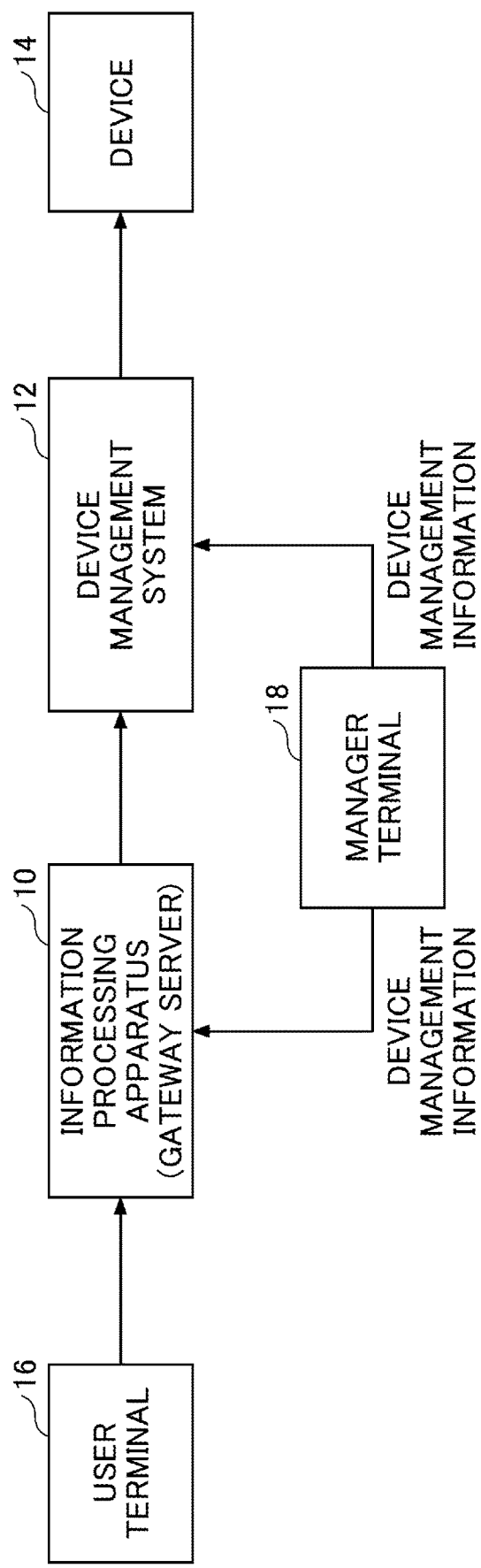
FIG. 3A is an example diagram illustrating a method for registering device management information with a Gateway server.
Figure 3B:
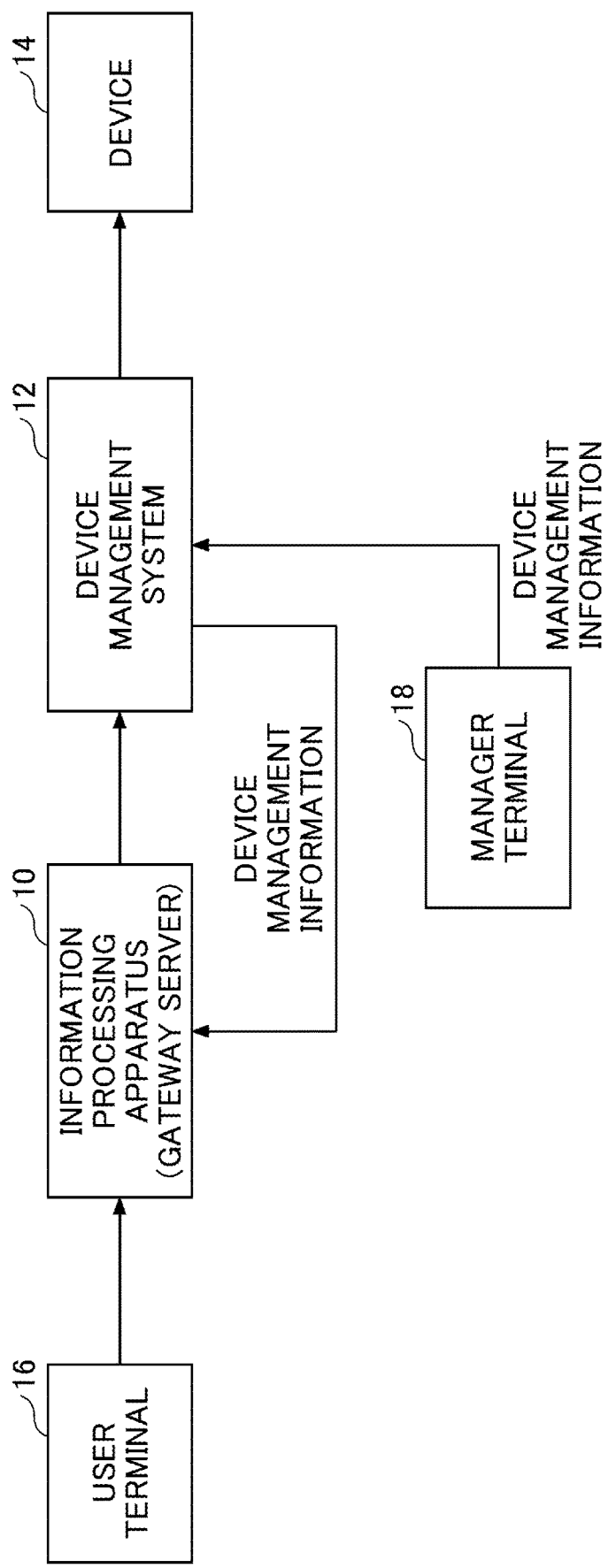
FIG. 3B is an example diagram illustrating a method for registering device management information with a Gateway server.

FIG. 3A and FIG. 3B are example diagrams illustrating a method for registering device management information with the Gateway server. FIG. 3A and FIG. 3B are examples in which the device 14 is already put under access control by the device management system 12, and device management information has been registered with the device management system 12 from the manager terminal 18.

In FIG. 3A and FIG. 3B, when user terminals 16 used by users and devices 14 co-exist, it is necessary to register device management information with the information processing apparatus 10 functioning as the Gateway server in order to realize control on accesses to the devices 14, which is suited to users.

In FIG. 3A, device management information has been registered with the information processing apparatus 10 by the manager from the manager terminal 18. Hence, it is necessary to register similar pieces of device management information doubly with two locations including the information processing apparatus 10 and the device management system 12. This increases the number of steps involved in the development. Moreover, because similar pieces of device management information are doubly registered with two locations including the information processing apparatus 10 and the device management system 12, there is a possibility that the device management information registered with the information processing apparatus 10 and the device management information registered with the device management system 12 may become contradictory.

Hence, in the information processing system 1 according to the present embodiment, device management information, which has been registered with the device management system 12 by the manager from the manager terminal 18, is supposed to be acquired by the information processing apparatus 10 from the device management system 12, as illustrated in FIG. 3B. In FIG. 3B, double registration of device management information with two locations including the information processing apparatus 10 and the device management system 12 from the manager terminal 18 is avoided.

<Software Configuration>
<<Functional Blocks>>

The functional blocks of the information processing apparatus 10 and the device management system 12 of the information processing system 1 according to the present embodiment will be described. FIG. 4 is an example functional block diagram of the information processing system according to the present embodiment. For expediency, the functional blocks of FIG. 4 do not include any parts that are unnecessary for describing the present embodiment.

The information processing apparatus 10 is configured to execute a program and realize an access key input receiving unit 50, a device management information acquiring unit 52, a virtual device generating unit 54, a virtual device 56, an accessing unit 58, and a device-describing information memory unit 60. The virtual device 56 is configured to include an informing unit 62. The device management system 12 is configured to execute a program and realize a device management information-acquiring API and a device-controlling API 72.

The access key input receiving unit 50 of the information processing apparatus 10 is configured to receive from the manager terminal 18, an input of an access key for the device management system 12, the access key being owned by a user. The access key for the device management system 12 is owned by each user for each device management system 12, and is, for example, an API key used when invoking the device management system 12.

The device management information acquiring unit 52 is configured to invoke a device management information-acquiring API of the device management system 12 by using the access key for the device management system 12 received by the access key input receiving unit 50. The device management information-acquiring API 70 sends back to the device management information acquiring unit 52, information (device management information) based on which a device 14 and a function of the device 14 that are usable by the user, as associated with the access key, are managed.

The virtual device generating unit 54 is configured to generate a TD corresponding to the device 14 managed by the device management system 12 based on the device management information acquired by the device management information acquiring unit 52 from that device management system 12. The TD is an example of device-describing information based on which information of the device 14 is shared in the information processing apparatus 10. The virtual device generating unit 54 stores the generated TD in the device-describing information memory unit 60. The virtual device generating unit 54 also generates a virtual device 56 based on the generated TD, and manages the virtual device 56 in the Gateway server. A WebThing of the WoT is an example of the virtual device 56. The virtual device generating unit 54 generates a WebAPI, and also generates a virtual device 56 such that the virtual device 56 responds to an access to the generated WebAPI in cooperation with the device 14.

The informing unit 62 of the virtual device 56 is configured to inform the user terminal 16 of a TD, which is an example of information including how to access a WebAPI. As a result, the user can access the WebAPI generated by the virtual device generating unit 54 from the user terminal 16.

The accessing unit 58 is configured to receive an access to the WebAPI from the user terminal 16, and access the device 14 via the virtual device 56. Specifically, the virtual device 56 receives an access to the WebAPI from the user terminal 16, and invokes the device-controlling API 72 of the device management system 12 that mediates an instruction from the WebAPI to the device 14. The device-controlling API 72 accesses the device 14 and controls the device 14 in accordance with the instruction from the WebAPI to the device 14.

<Process>

FIG. 5 is an example sequence diagram of a device registration process. In the step S10, the access key input receiving unit 50 of the information processing apparatus 10 receives a user's input of a user's owned access key for a device management system 12 from the manager terminal 18.

In the step S12, the device management information acquiring unit 52 invokes the device management information-acquiring API 70 of the device management system 12, by using the user's access key for the device management system 12 received by the access key input receiving unit 50.

In the step S14, the device management information-acquiring API 70 acquires from the device 14, information necessary for sending back device management information. The information acquired from the device 14 includes, for example, identification information of the device 14 and function information of the device 14.

In the step S16, the device management information-acquiring API 70 sends back device management information of the user, based on which the device 14 and a function of the device 14 that are usable by the user, as associated with the access key, are managed, to the device management information acquiring unit 52.

Figure 6:
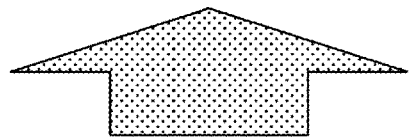
FIG. 6 is an example diagram illustrating a device's unique format and a WoT standard format.

In the step S18, the virtual device generating unit 54 of the information processing apparatus 10 generates a TD in the WoT standard format based on the device management information in the device's unique format as illustrated in, for example, FIG. 6, which is acquired by the device management information acquiring unit 52. FIG. 6 is an example diagram illustrating the device's unique format and the WoT standard format.

As illustrated in FIG. 6, the device's unique format and the TD in the WoT standard format have many common parts, so long as they concern a device 14 of the same type. Once a template is prepared for each type of a device 14, the process of generating a TD will be simplified by transcription of ID. The virtual device generating unit 54 stores the generated TD in the device-describing information memory unit 60.

The virtual device generating unit 54 generates a WebAPI for a virtual device 56, which is to be generated in the step S20. The virtual device generating unit 54 generates the WebAPI for a virtual device 56 based on the generated TD. In the step S20, the virtual device generating unit 54 generates a virtual device 56 based on the generated TD.

According to the process illustrated in the sequence diagram of FIG. 5, the information processing apparatus 10 can acquire device management information of a user, based on which a device 14 and a function of the device 14 that are usable by the user, as associated with the access key, are managed from the device management system 12. The information processing apparatus 10, which has acquired the device management information of the user from the device management system 12, can generate a TD based on the device management information of the user, and can generate a virtual device 56 based on the TD.

Figure 7:
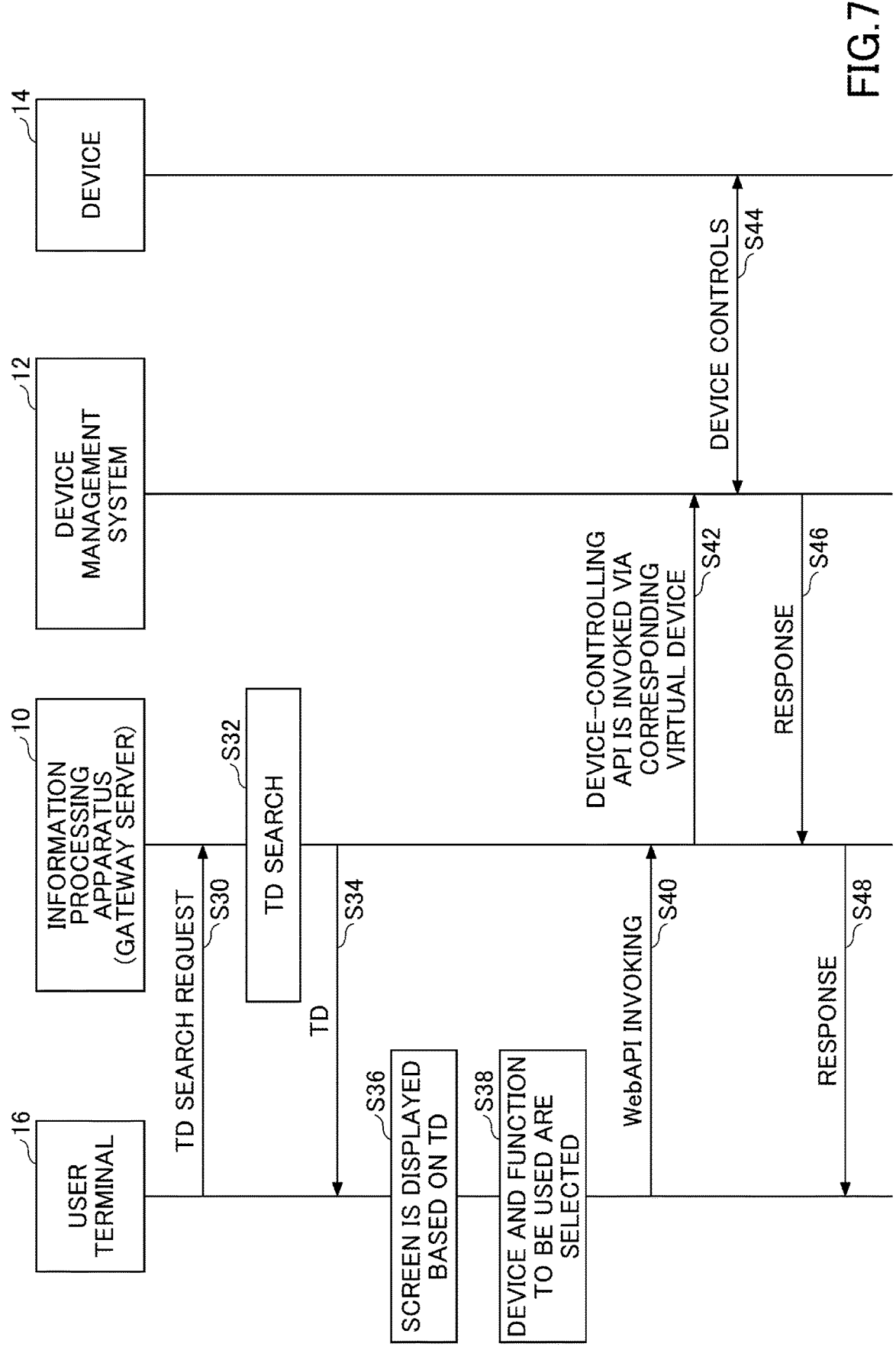
FIG. 7 is an example sequence diagram of a process for controlling an access to a device.

After the virtual device 56 is generated in the information processing apparatus 10 in this way, the user using the user terminal 16 can access the virtual device 56 and use the device 14 in accordance with a procedure illustrated in FIG. 7.

FIG. 7 is an example sequence diagram of a process for controlling an access to a device. When the user is going to control the device 14 from the user terminal 16, the user terminal 16 needs to acquire information including how to access the WebAPI for the virtual device 56 from the information processing apparatus 10.

In the step S30, the user terminal 16 undergoes user authentication as needed, and requests the information processing apparatus 10 to search for the TD corresponding to the user. In the step S32, the information processing apparatus 10 searches the device-describing information memory unit 60 for the TD corresponding to the user. In the step S34, the informing unit 62 of the information processing apparatus 10 sends the TD corresponding to the user to the user terminal 16. By the process up until this point, the user terminal 16 can acquire a TD regarding the device 14 usable by the user and a function of the device 14 usable by the user.

In the step S36, the user terminal 16 displays a screen via which it receives, for example, a monitoring operation and a controlling operation on the device 14 from the user, based on the acquired TD. Since the screen displayed on the user terminal 16 is generated based on the TD regarding the device 14 usable by the user and the function of the device 14 usable by the user, the screen content corresponds to the device 14 usable by the user and the function of the device 14 usable by the user.

In the step S38, the user operates the user terminal 16 and selects the device 14 and the function, which the user is going to use, on the screen. In the step S40, the user terminal 16 accesses the virtual device 56 (or invokes the WebAPI for the virtual device 56) using a URL corresponding to the device 14 and the function selected on the screen.

The accessing unit 58 of the information processing apparatus 10 receives invoking of the WebAPI for the virtual device 56 from the user terminal 16. The accessing unit 58 selects the virtual device 56 corresponding to the device 14 and the function selected by the user, in response to the invoking of the WebAPI received from the user terminal 16. In the step S42, the selected virtual device 56 invokes the device-controlling API 72 for the device 14 and the function that are selected by the user.

In the step S44, the device-controlling API 72 of the device management system 12 accesses the device 14 and controls the device 14 in accordance with the invoking received (or an instruction to the device 14). When the device 14 is, for example, an air conditioner, the device-controlling API 72 performs controls on, for example, operation ON/OFF and set temperature changes.

In the step S46, the device management system 12 sends back the results of the controls on the device 14 performed in the step S44 to the information processing apparatus 10 as a response. In the step S48, the virtual device 56 of the information processing apparatus 10 receives the response from the device management system 12, and returns the response to the user terminal 16 via the accessing unit 58. Hence, the user terminal 16 can display the results of, for example, the monitoring operation and the control operation on the device 14, which the user terminal 16 has received from the user.

[Other Embodiments]

When control on accesses to a plurality of types of devices 14 is the management target, it is necessary to input an access key that is owned by a user for a corresponding device management system 12. Hence, the information processing apparatus 10 according to the present embodiment includes an access key managing unit 82 as illustrated in FIG. 8, and associates access keys for invoking respective device management systems 12 with user's authentication information for logging into the information processing apparatus 10.

Figure 8:
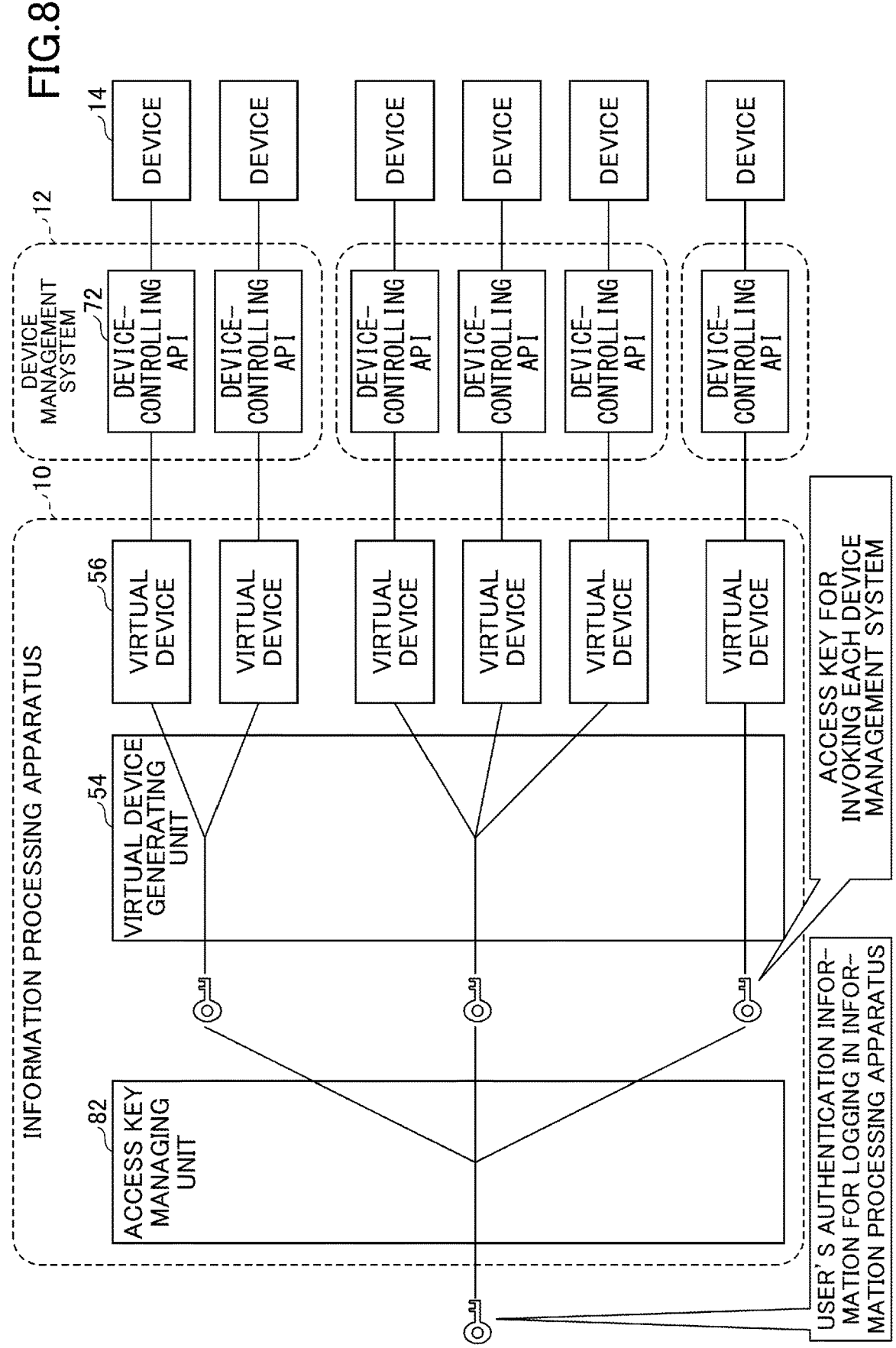
FIG. 8 is an example diagram illustrating an access key managing unit.

FIG. 8 is an example diagram illustrating the access key managing unit. The access key managing unit 82 is configured to manage access keys for invoking respective device management systems 12 in association with a user's authentication information for logging into the information processing apparatus 10. When authentication information of a user for logging into the information processing apparatus 10 is input, the access key managing unit 82 can find access keys needed for the user to invoke respective device management systems 12.

The virtual device generating unit 54 generates a TD corresponding to a device 14 managed by a corresponding device management system 12 based on device management information of the user, which is acquired from the device management system 12 using a found access key. The virtual device generating unit 54 can generate a virtual device 56 for the device 14 managed by the corresponding device management system 12 based on the generated TD.

Hence, the information processing apparatus 10 according to the present embodiment can find an access key needed for a user to invoke each device management system 12, upon input of the user's authentication information for logging into the information processing apparatus 10. This reduces time and resources of the manager and the user.

Figure 9:
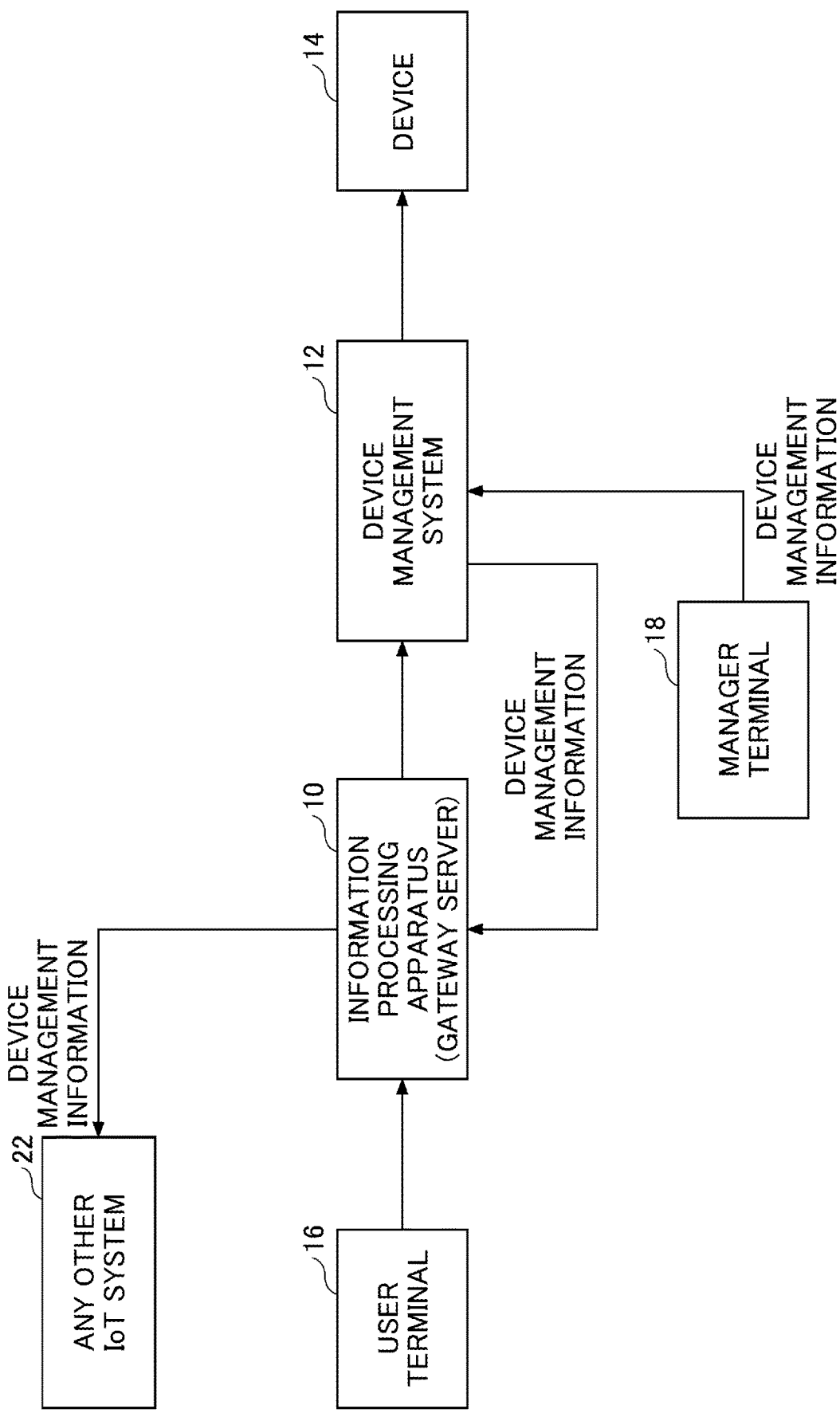
FIG. 9 is an example diagram illustrating collaboration with any other IoT system.

When the information processing system 1 according to the present embodiment collaborates with any other IoT system 22 as illustrated in FIG. 9, it is necessary to register device management information also with the any other IoT system 22. FIG. 9 is an example diagram illustrating collaboration with any other IoT system. The information processing apparatus 10 according to the present embodiment includes a device-describing information output unit 84 described below and configured to output device management information in the form of a WoT-format TD, such that a similar access control can likewise be realized in the any other IoT system 22.

Figure 10:
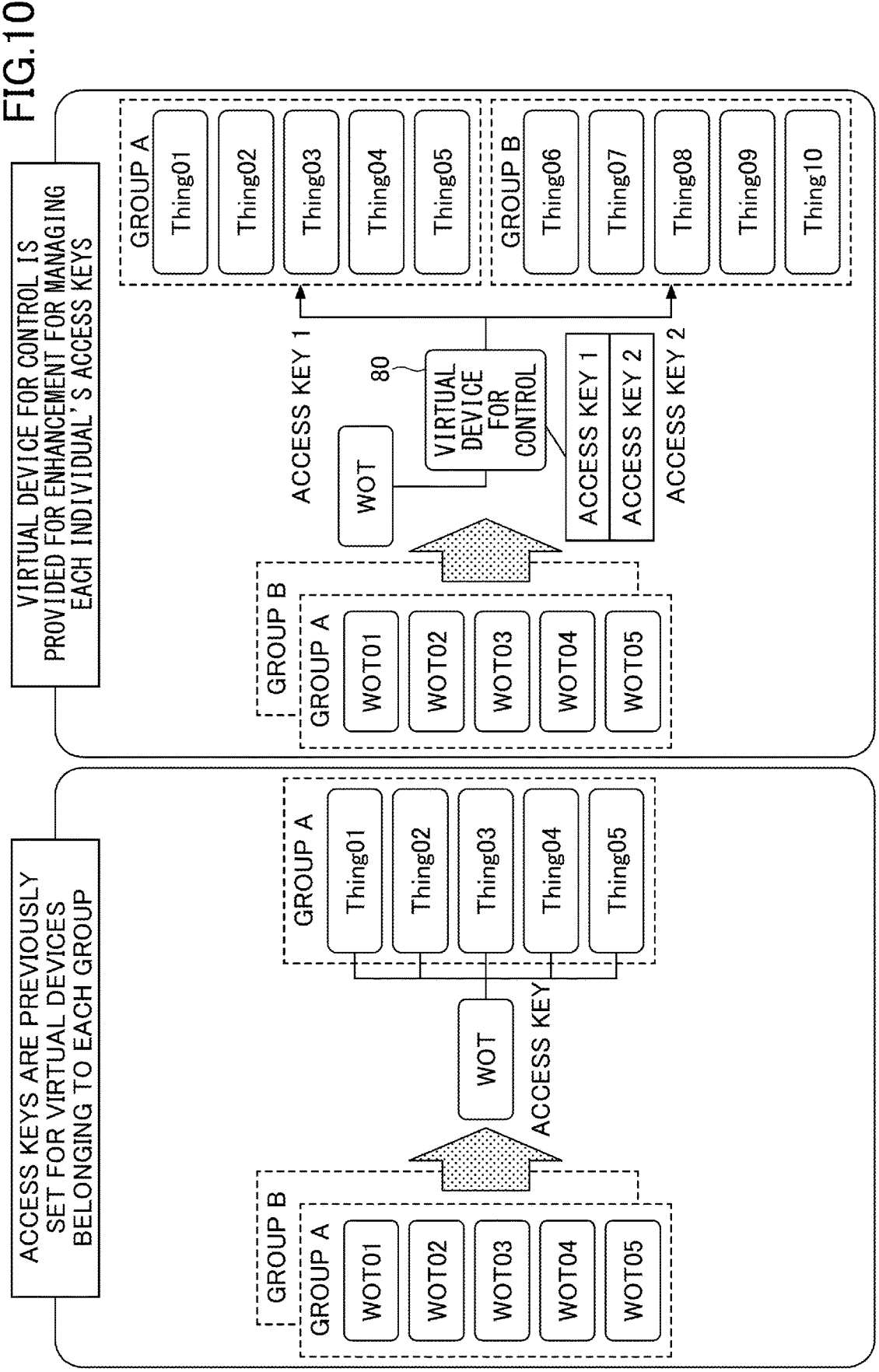
FIG. 10 is an example diagram illustrating a virtual device for control.

Moreover, when control on accesses to a plurality of types of devices 14 is the management target, a virtual device 80 for control as illustrated in FIG. 10 configured to have an access key, which is owned by a user for a corresponding device management system 12, registered with and manage the access key may be provided. FIG. 10 is an example diagram illustrating the virtual device for control.

FIG. 10 denotes virtual devices 56 by "WOT01" through "WOT05", and devices 14 by "Thing01" through "Thing10". FIG. 10 illustrates the devices 14 of a same type by grouping. "Thing01" through "Thing05" of a group A are the devices 14 of a same type such as air conditioners, and "Thing06" through "Thing10" of a group B are the devices 14 of a same type such as lighting devices. FIG. 10 denotes correspondence between the virtual devices 56 and the devices 14 by numbers. For example, the virtual device 56 corresponding to the device 14 denoted as "Thing01" is "WOT01".

As illustrated in FIG. 10, a group-by-group access key is previously set for the virtual devices 56 belonging to each group. For example, in the example of FIG. 10, an "access key 1" is set for the virtual devices 56 of the group A, and an "access key 2" is set for the virtual devices 56 of the group B.

The virtual device 80 for control is generated per user, and is configured to manage access keys of the user. FIG. 10 illustrates an example in which a given user is managing the "access key 1" for the device management system 12 that manages the devices 14 of the group A and the "access key 2" for the device management system 12 that manages the devices of the group B.

By generating the virtual device 80 for control per user in this way, the information processing apparatus 10 according to the present embodiment can restrict access from any other users.

Figure 11:
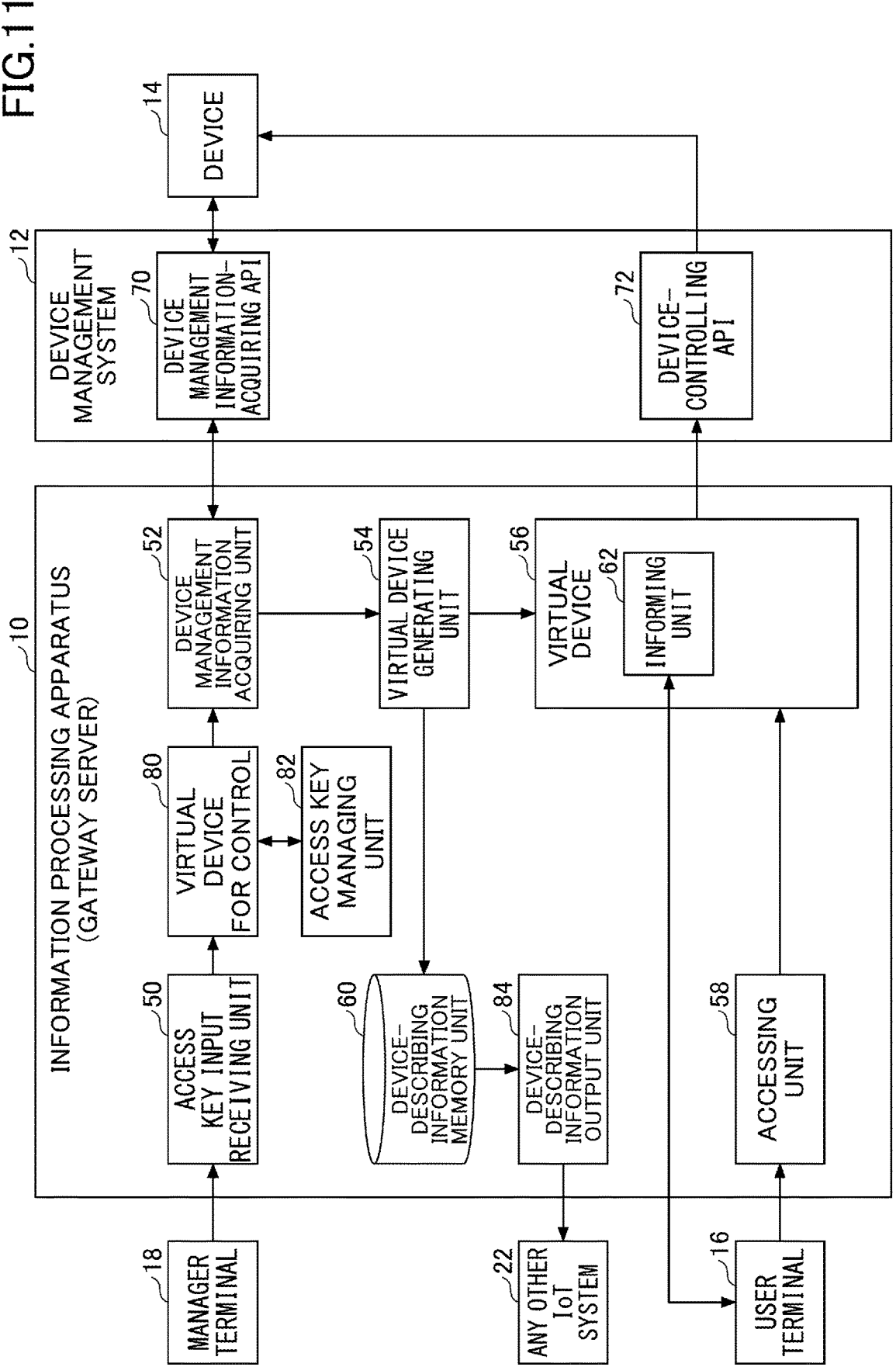
FIG. 11 is an example functional block diagram of an information processing system according to an embodiment.

The information processing apparatus 10 including the virtual device 80 for control, the access key managing unit 82, and the device-describing information output unit 84 described above is configured as illustrated in, for example, FIG. 11. FIG. 11 is an example functional block diagram of the information processing system according to the present embodiment. The functional blocks of FIG. 11 do not include any parts that are unnecessary for describing the present embodiment.

The functional blocks of FIG. 11 include the virtual device 80 for control, the access key managing unit 82, and the device-describing information output unit 84 in addition to the functional blocks illustrated in FIG. 4. The virtual device 80 for control is generated per user. The virtual device 80 for control provides a managed access key of a user to the device management information acquiring unit 52, such that device management information is acquired from the device management system 12 corresponding to that access key of the user.

The access key managing unit 82 is configured to manage an access key for each device management system 12 in association with a user's authentication information needed for a user to log into the information processing apparatus 10. When a user's authentication information for logging into the information processing apparatus 10 is input, the access key managing unit 82 finds an access key of the user prepared for each device management system 12.

The device-describing information output unit 84 is configured to output device management information in the form of a WoT-format TD, which is stored in the device-describing information memory unit 60, to any other IoT system 22, when the device-describing information output unit 84 collaborates with the any other IoT system 22.

In the information processing system 1 according to the present embodiment, the device management information needed for control on a user's access to the device 14 is seamlessly linked between the information processing apparatus 10 functioning as the Gateway server and the device management system 12. This enables the Gateway server to automatically control a user's access to the device 14, and can reduce the number of steps involved in the development.

The embodiments have been described above. However, it will be understood that various modifications are applicable to the embodiments and particulars without departing from the spirit and scope of the claims. The present invention has been described above based on Examples. However, the present invention is not limited to the Examples described above, and various modifications are applicable within the scope described in the claims. The present application claims priority to a basic application No. 2021-032383 filed with the Japan Patent Office on Mar. 2, 2021, the entire contents of which are incorporated herein by reference.

REFERENCE SIGNS LIST

1: information processing system
10: information processing apparatus
12, 12A, 12B: device management system
14, 14A, 14B: device
16: user terminal
18: manager terminal
50: access key input receiving unit
52: device management information acquiring unit
54: virtual device generating unit
56: virtual device
58: accessing unit
60: device-describing information memory unit
62: informing unit
70: device management information-acquiring API
72: device-controlling API
80: virtual device for control
82: access key managing unit
84: device-describing information output unit

The invention claimed is:

1. An information processing apparatus configured to communicate over a network with a device management system that manages and controls access to user-available devices among a plurality of devices and user-accessible functions of the user-available devices, based on device management information, the device management system being physically independent and separate from the information processing apparatus and storing the device management information, comprising:
   a memory; and
   a processor coupled to the memory and configured to:
      access the device management information through the network from the device management system;
      generate a WebAPI and a virtual device based on the device management information, the virtual device, in conjunction with the device management system, accessing the user-available devices in response to a WebAPI call from a user terminal of a user;
      inform the user terminal of information including how to call the WebAPI; and
      in response to the WebAPI call from the user terminal, access the user-available devices via the virtual device,
   wherein the information processing apparatus is a gateway server, and
   wherein the processor is configured to:
      provide an access key to the device management system and acquire the device management information via a device management information-acquiring API of the device management system, the device management information-acquiring API corresponding to the access key, and
      generate the virtual device that is based on the device management information.

2. The information processing apparatus according to claim 1,
   wherein the processor is configured to manage authentication information of the user and the access key in association with each other.

3. The information processing apparatus according to claim 1,
   wherein the processor is configured to generate device-describing information based on which device information is shared in the information processing apparatus based on the device management information, and generate the virtual device based on the device-describing information.

4. The information processing apparatus according to claim 3,
   wherein the processor is configured to output the generated device-describing information.

5. The information processing apparatus according to claim 1,
   wherein one or more access keys are registered to the virtual device,
   wherein the virtual device is configured to provide the one or more access key to the device management system such that the device management information is acquired via a device management information-acquiring API of the device management system, the device management information-acquiring API corresponding to the one or more access key, and
   wherein the processor is configured to generate the virtual device that is based on the device management information.

6. The information processing apparatus according to claim 5,
   wherein the virtual device is generated per user.

7. The information processing apparatus according to claim 1,
   wherein the device management information includes one or more selected from a name of the plurality of device, data that can be acquired collaterally with the plurality of device, information regarding a function that can be used collaterally with the plurality of device, and access information based on which the plurality of device is accessed.

8. An information processing method for an information processing apparatus, the information processing apparatus configured to communicate over a network with a device management system that manages and controls access to user-available devices among a plurality of devices and user-accessible functions of the user-available devices, based on device management information, the device management system being physically separate from the information processing apparatus and storing the device management information, and the information processing apparatus being a gateway server, the method comprising:
   accessing the device management information through the network from the device management system;
   generating a WebAPI and a virtual device based on the device management information, the virtual device, in conjunction with the device management system, accessing the user-available devices in response to a WebAPI call from a user terminal of a user;
   informing the user terminal of information including how to call the WebAPI;
   in response to the WebAPI call from the user terminal, accessing the user-available devices via the virtual device;
   providing an access key to the device management system and acquiring the device management information via a device management information-acquiring API of the device management system, the device management information-acquiring API corresponding to the access key, and
   generating the virtual device that is based on the device management information.

9. A non-transitory computer-readable recording medium having stored therein an information processing program that causes a processor of an information processing apparatus to perform steps, the information processing apparatus configured to communicate over a network with a device management system that manages and controls access to user-available devices among a plurality of devices and user-accessible functions of the user-available devices, based on device management information, the device management system being physically independent and separate from the information processing apparatus and storing the device management information, and the information processing apparatus being a gateway server, the steps comprising:
   accessing the device management information through the network from the device management system;
   generating a WebAPI and a virtual device based on the device management information, the virtual device, in conjunction with the device management system, accessing the user-available devices in response to a WebAPI call from a user terminal of a user;
   informing user terminal of information including how to call the WebAPI;
   in response to the WebAPI call from the user terminal, accessing the user-available devices via the virtual device;
   providing an access key to the device management system and acquiring the device management information via a device management information-acquiring API of the device management system, the device management information-acquiring API corresponding to the access key, and generating the virtual device that is based on the device management information.

10. An information processing system, comprising:

a device management system configured to manage and control access to user-available devices among a plurality of devices and user-accessible functions of the user-available devices, based on device management information, the device management information is stored in the device management system; and an information processing apparatus communicate over a network with a user terminal of a user and the device management system, the device management system being physically independent and separate from the information processing apparatus, wherein the device management system includes a device management information-acquiring API configured to provide the device management information, wherein the information processing apparatus is a gateway server, and wherein the information processing apparatus includes:
 a memory; and
  a processor coupled to the memory and configured to:
   access the device management information through the network via the device management information-acquiring API of the device management system;
  generate a WebAPI and a virtual device based on the device management information, the virtual device, in conjunction with the device management system, accessing the user-available devices in response to a WebAPI call from the user terminal;
   inform the user terminal of information including how to call the WebAPI;
  in response to the WebAPI call from the user terminal, access the user-available devices via the virtual device;
   provide an access key to the device management system and acquire the device management information via a device management information-acquiring API of the device management system, the device management information-acquiring API corresponding to the access key, and
  generate the virtual device that is based on the device management information.

* * * * *